Nov. 29, 1927.

E. ROSENBERG 1,650,851

CONTINUOUS CURRENT GENERATOR

Filed Sept. 28, 1926

Inventor
E. Rosenberg
by Langner, Parry, Card & Langner
Att'ys.

Patented Nov. 29, 1927.

1,650,851

UNITED STATES PATENT OFFICE.

EMANUEL ROSENBERG, OF WEIZ, AUSTRIA.

CONTINUOUS-CURRENT GENERATOR.

Application filed September 28, 1926, Serial No. 138,326, and in Austria June 22, 1925.

The present invention shows improvements in continuous current generators which are subjected to short circuits or very high speed and which are required to give a limited current which should be adaptable in every case to the particular service for which the machine is required at the time. It refers especially to generators that feed electric arcs, in particular for arc welding and has for its object to regulate the welding current from a high value that may be required with big electrodes to a small value when using small electrodes.

Figure 1:
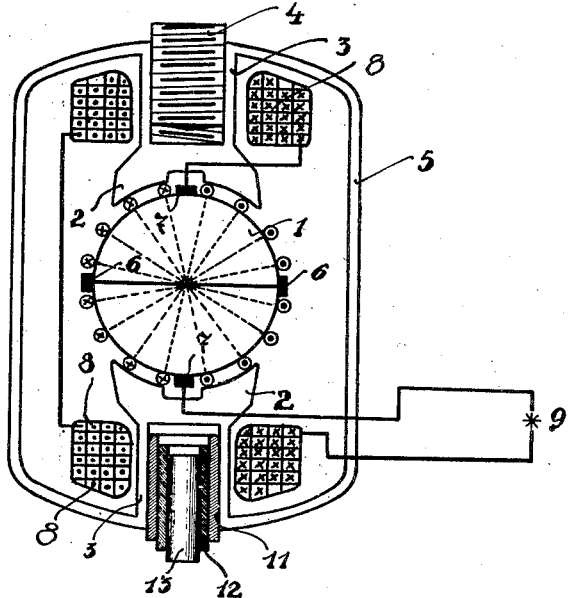
Figure 2:
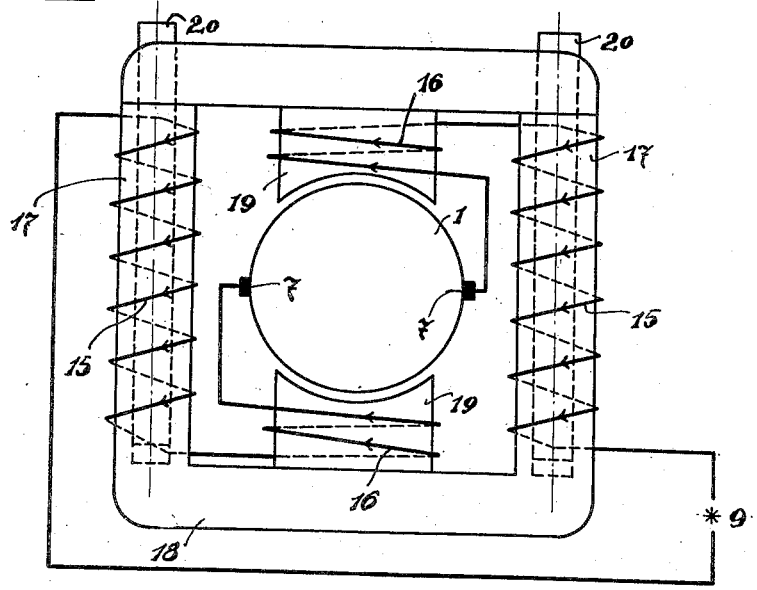

The Figs. 1 and 2 of the accompanying drawing show my invention applied to different forms of machines.

In Rosenberg U. S. Patent 954,468 of April 12th, 1910, a particular form of continuous current machine is shown with an armature provided with two sets of brushes, one situated at the normal place and short circuited in itself for the purpose of cross magnetizing the armature and the second set of brushes shifted by half a pole pitch and supplying the main current into the external circuit. The current supplied by the main brushes magnetizes the armature in a way directly opposed to the primary field and therefore the current cannot exceed a certain definite value if the field coils are excited with a definite amount of ampere turns, no matter whether the speed of the armature may be raised indefinitely or the external mains short circuited.

It has been shown in my U. S. Patent 1,084,365 of January 13th, 1914, that the current is limited even if the field coils are series connected with the external circuit, provided that parts of the magnetic circuit are so arranged as to obtain great saturation and the leakage flux can freely develop due to the design of the pole tips. In this case the primary field rises with increasing current only to a certain extent while, starting from a certain point, the demagnetization caused by the armature ampere turns overpowers the increase in primary field so as to give, in toto, starting from a certain point, a drooping voltage characteristic and a definite current in case of a short circuit in the external mains.

My invention consists in a local variation of the iron section of a part of the magnetic circuit so as to limit at will the greatest value which the primary field may obtain and the current which the machine can supply into the external circuit.

In Fig. 1 of the accompanying drawing a bipolar machine is shown, the poles of which are designed to be regulated in the manner aforesaid. There is an armature 1, the pole tips 2 belong to the poles 3 into which pieces of magnetic material 4, 11, 12, 13 are inserted. The upper regulating pole has an opening in which an iron piece 4 may be screwed in to different depths. 5 is the casing of the machine, 6 the auxiliary brushes of the armature which are in the usual neutral zone and short circuited in themselves, 7 the main brushes which are shifted by half a pole pitch and series connected both with the field coils 8 and the external circuit which is represented by the arc 9. The armature has coils 10, wound in the usual fashion of a bipolar armature. As long as the current of the main brushes exceeds the current of the auxiliary brushes the direction of the current in all conductors of the armature winding is such as to oppose the magnetization caused by the field coils 8. This is indicated by points and crosses both in field coils 8 and armature coils 10. In the lower pole tubes 11, 12 and an inner piece 13 are shown which allow an even finer graduation of the iron section than the single screw piece 4 in the upper pole. The machine acts in the following way:

As long as the external circuit is not closed the residual magnetism of the field will cause a current to flow between the auxiliary brushes 6 which current cross magnetizes the armature and causes a certain voltage to be set up between the main brushes 7. Provided a high resistance was inserted in the outer circuit 9 and this resistance was reduced gradually the current gradually increasing will at first increase the strength of the primary field therefore also the current between the auxiliary brushes and therefore the voltage between the main brushes 7. If, however, the reduction of the outer resistance and the value of the main current has obtained a certain value the primary field will approach saturation while the armature reaction has a leakage path at its disposal which allows a continuous rise in the armature reaction field. In such a way with further increase in the main current the current between the auxiliary brushes of the armature is reduced and likewise the voltage between the main brushes. By shifting the piece 4 it is possible to vary at will the current up to which an increase in voltage continues and to vary definitely also the current obtained when short circuiting the external circuit. To give an instance, it is possible with an arc welding machine if the pieces are entirely screwed in to obtain 500 amps. in the short circuited arc, when the external voltage of the machine is 0. With the arc at its ordinary length, the voltage may be 25 volts and the current 400 amps. With the arc drawn longer, the current drops and the maximum voltage rises to 80 volts while with the arc entirely extinguished the residual magnetism is still sufficient to produce a current between the short circuited auxiliary brushes that gives 40 volts between the main brushes. The same machine with the pieces in the regulating poles screwed out to the greatest extent may give 100 amps. with the arc short circuited, while the maximum voltage and the voltage on open circuit do not differ greatly from the voltages as mentioned before so as to give a good arc welding generator adaptable for every required current without any regulating rheostats.

The regulating pole may be used with another machine adapted for arc welding and shown in Fig. 2 of the accompanying drawing. Here the armature is an ordinary armature with one set of brushes. The field is built in the manner of the old Manchester type, but there is a main exciting winding 15 and in series with it an opposing winding 16 which through the leakage of the pole tips can produce an opposing field. 17 are the columns which carry the main exciting coils 15, the yokes 18 are fitted with pole tips 19 and these with opposing coils 16. The armature 1 has brushes 7, the external circuit is represented by the arc 9. In this well known machine according to my invention, pieces 20 are provided in holes of the columns of the magnetic field, which can be shifted in and out. Exactly like with the machine of Fig. 1, according to the position of the pieces 20, the field will approach saturation with different values of current and as the opposing field has leakage paths without saturation a drooping characteristic will be obtained starting from a different value of the current, and the current obtained when short circuiting the outer circuit may be varied at will through shifting the pieces in the regulating poles.

If a machine like that of Fig. 1 is used as axle driven generator for car lighting its output can be changed at will by proper setting of the screwed in pieces. Such a machine is in general not provided with a series winding but with a separately excited or shunt winding.

I wish it to be understood that I do not desire to be limited to the exact details of the construction shown and described, for obvious modification will occur to a person skilled in the art.

I claim:

1. In a dynamo electric machine, a field magnet structure, a coil to excite said field magnet structure, a coil in which the current opposes the field magnetization, the said field magnet structure comprising a yoke, massive pole pieces presenting a path of low reluctance for the opposing flux, and connecting portions between the yoke and the pole pieces, and a movable piece of magnetic material in said connecting portions.

2. In a dynamo electric machine, a series wound field magnet structure having a portion arranged to be saturated by a fraction of full load current, a movable piece of magnetic material in said portion of the field magnet structure, and windings to form circuits in which the current opposes the field magnetization.

3. In a dynamo electric machine, a series wound magnet structure, an armature provided with a commutator and windings to form circuits in which the current opposes the field magnetization and commutator brushes and connections short circuiting the armature on a line displaced 90 electric degrees from the line of field magnetization, and a second set of brushes displaced 90 electric degrees from the first set and connected to an external circuit, the said field magnet structure comprising a yoke, massive pole pieces having a path of low reluctance for the armature flux and connecting portions between the yoke and pole pieces, said connecting portions being so reduced in cross section, as to become saturated by a fraction of full load current and a movable piece of magnetic material in said connecting portions.

4. In a dynamo electric machine a series wound field magnet structure having a portion arranged to be saturated by a fraction of full load current, a movable piece of magnetic material in the core of the field magnet structure, an armature provided with a commutator, commutator brushes and connections short circuiting the armature on a line displaced ninety electric degrees from the line of field magnetization, and a second set of brushes displaced ninety electric degrees from the first set and connected to the series coil and an external circuit comprising an electric arc.

5. In a dynamo electric machine a series wound field magnet structure having a portion arranged to be saturated by a fraction of full load current, a movable piece of magnetic material in the core of the field magnet structure, an armature provided with a commutator, commutator brushes and connections short circuiting the armature on a line displaced ninety electric degrees from the line of field magnetization, and a second set of brushes displaced ninety electric degrees from the first set and connected to the series coil and an external circuit comprising an electric arc for welding, the field magnet having a leakage path of low reluctance for the flux produced by the current passing through the second set of brushes.

6. A series excited arc welding generator having a field structure containing movable tubes of magnetic material and a concentric movable piece of magnetic material therein for the purpose of regulating the welding current.

7. A dynamo electric machine having a field structure containing movable tubes of magnetic material and a concentric movable piece of magnetic material therein.

In testimony whereof I affix my signature.

EMANUEL ROSENBERG.